(12) United States Patent
Johns et al.

(10) Patent No.: US 7,229,274 B2
(45) Date of Patent: Jun. 12, 2007

(54) TOOLING SYSTEM

(75) Inventors: Albert D. Johns, Saylorsburg, PA (US);
Mircea T. Sofronie, Easton, PA (US)

(73) Assignee: Dixie Consumer Products LLC, Atlanta, GA (US)

( * ) Notice: Subject to any disclaimer, the term of this patent is extended or adjusted under 35 U.S.C. 154(b) by 165 days.

(21) Appl. No.: 11/155,720

(22) Filed: Jun. 20, 2005

(65) Prior Publication Data

US 2005/0233024 A1 Oct. 20, 2005

Related U.S. Application Data

(63) Continuation of application No. 10/087,752, filed on Mar. 5, 2002, now Pat. No. 6,908,296.

(51) Int. Cl.
*B29C 43/04* (2006.01)

(52) U.S. Cl. .................. 425/394; 425/403.1; 425/411; 425/422; 425/443; 264/334

(58) Field of Classification Search ............. 425/403.1, 425/410, 411, 422, 406, 394, 441, 443; 264/334
See application file for complete search history.

(56) References Cited

U.S. PATENT DOCUMENTS 4,755,128 A * 7/1988 Alexander et al. .......... 425/292
4,832,676 A * 5/1989 Johns et al. ................ 493/152
6,139,307 A * 10/2000 Plourde et al. ......... 425/192 R
6,261,082 B1 * 7/2001 Han .......................... 425/412
6,589,043 B1 * 7/2003 Johns et al. ............. 425/403.1

* cited by examiner

*Primary Examiner*—Yogendra N. Gupta
*Assistant Examiner*—Thu Khanh T. Nguyen
(74) *Attorney, Agent, or Firm*—Georgia-Pacific LLC; Jacqueline M. Hutter

(57) ABSTRACT

A tooling system in a press for forming a product from a blank of material disposed between a punch assembly and a die assembly and a method of using the same. The tooling system comprises a knockout and a bushing. The knockout further comprises a shaft having opposed ends, a plate fixed to one opposed end, and a tapered portion. The bushing is supported by one of the punch and die assemblies and defines a lumen configured to slidably receive the shaft for axial movement between an extended position and a retracted position. The lumen has a tapered receiving section at one end thereof configured to mate with the tapered portion of the knockout when the shaft is in the extended position.

6 Claims, 14 Drawing Sheets

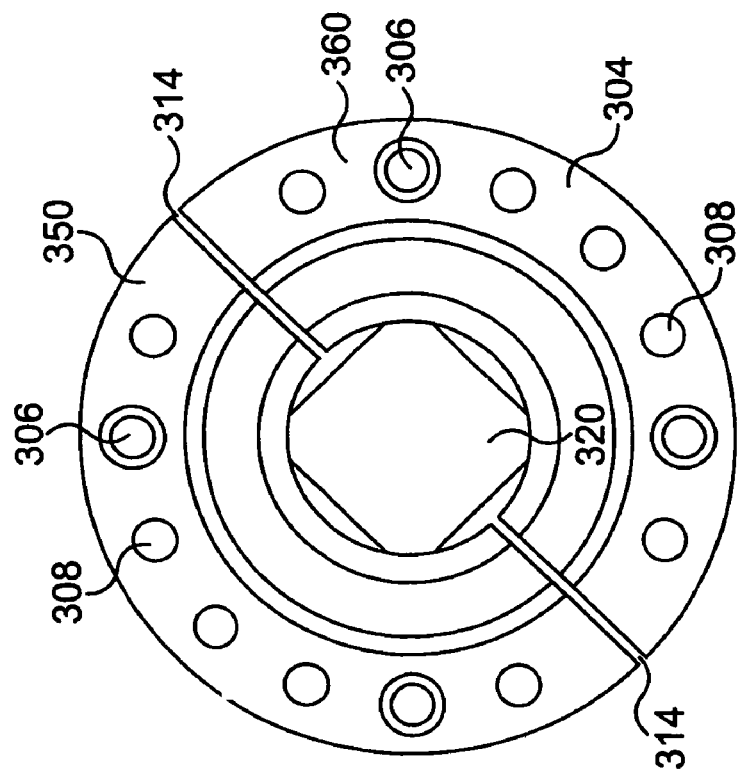
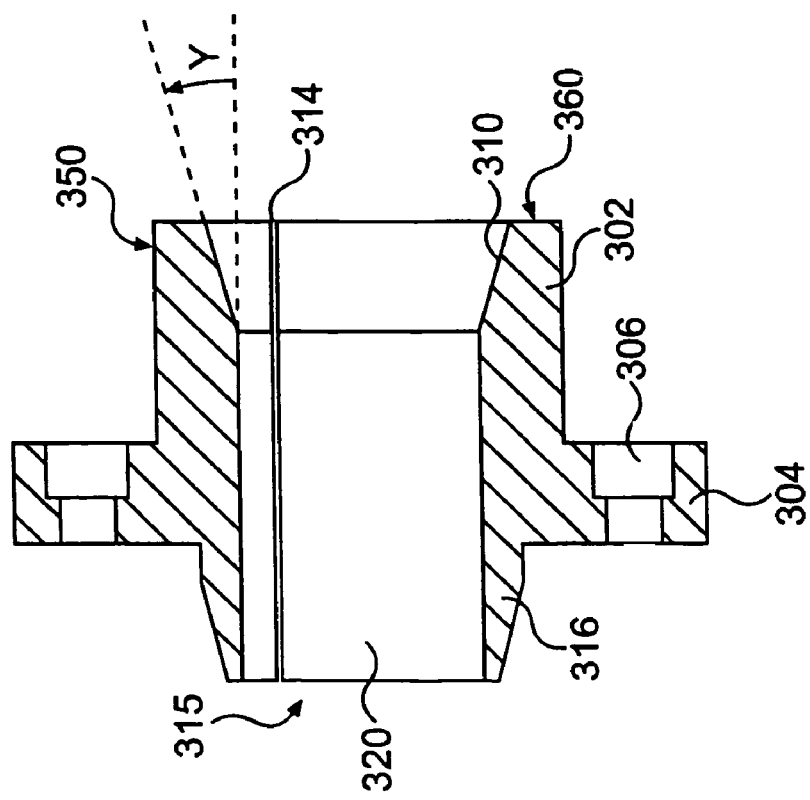
FIG. 5b
FIG. 5a

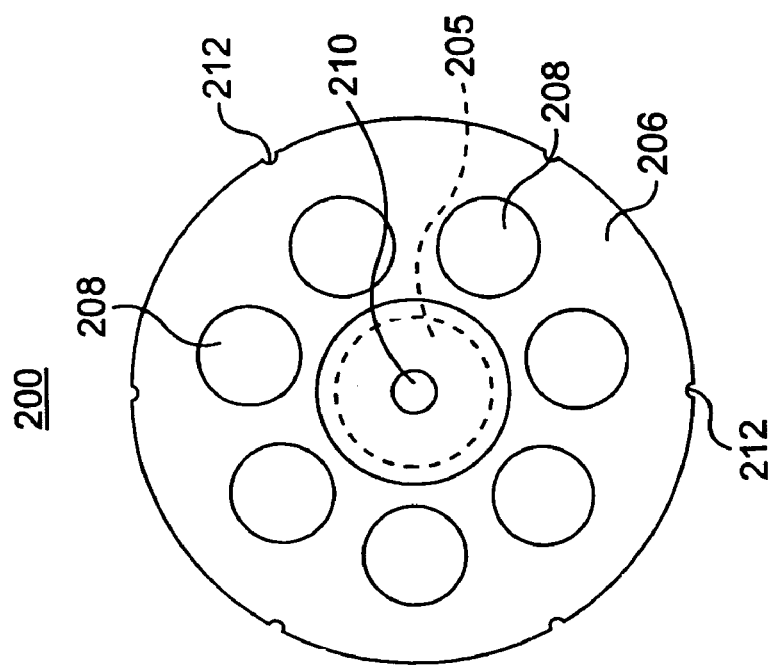
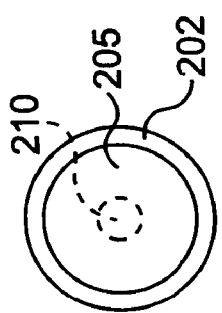
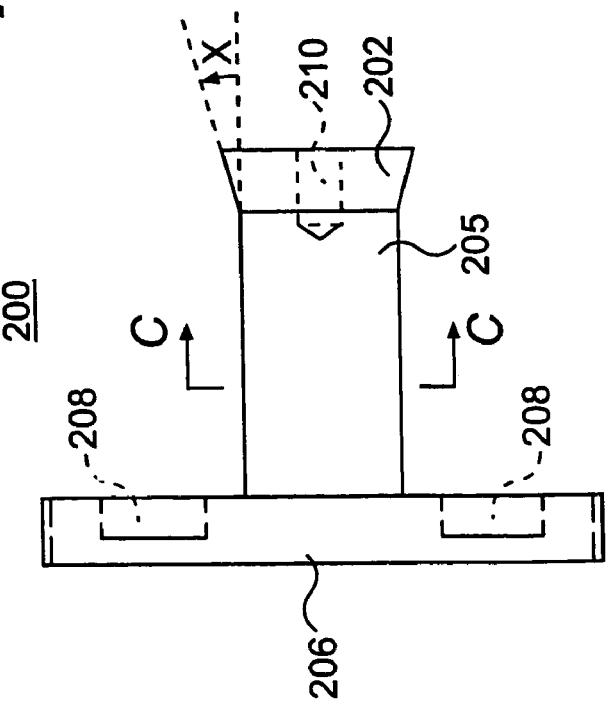
FIG. 6b
FIG. 6c
FIG. 6a

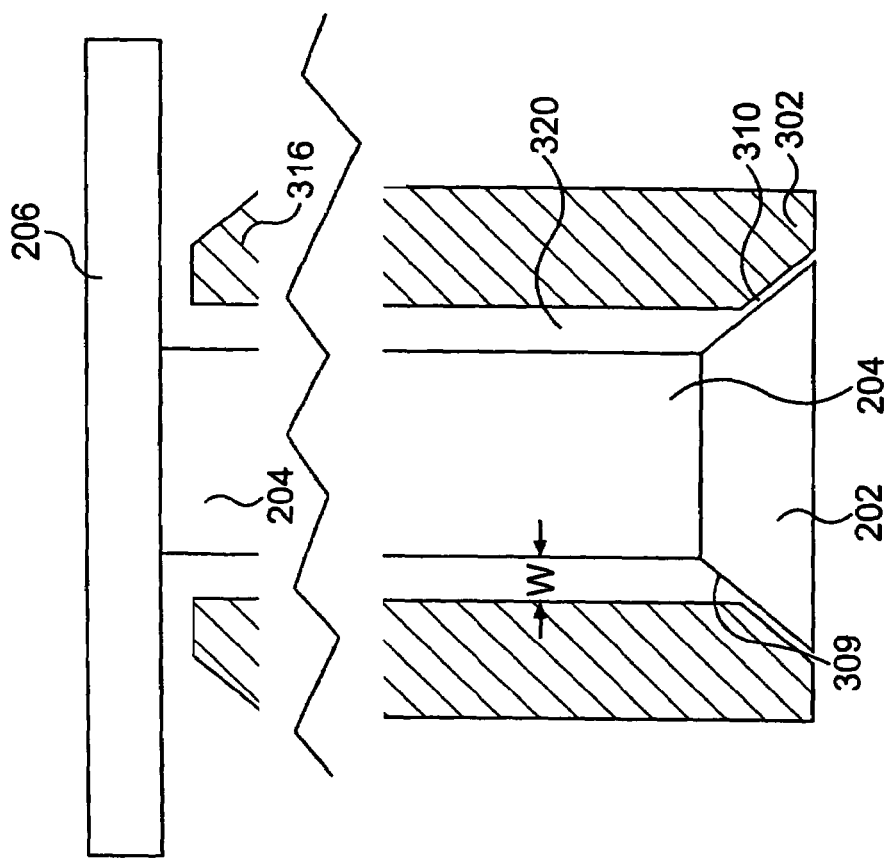
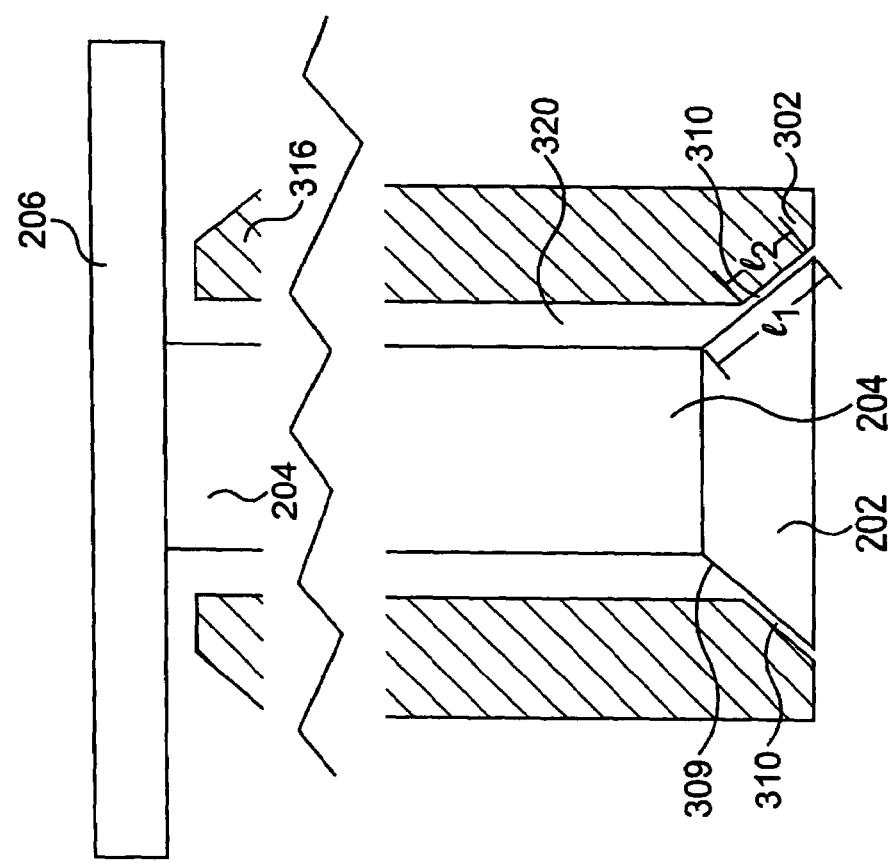

TOOLING SYSTEM

This is a continuation of application Ser. No. 10/087,752, filed Mar. 5, 2002, now U.S. Pat. No. 6,908,296, all of which is incorporated herein by reference.

FIELD OF THE INVENTION

The present invention relates generally to tooling systems, including those used for pressware applications and other material formation applications. More particularly, the present invention relates to a tooling system having a die assembly and a punch assembly, wherein at least one of the die and punch assemblies has a knockout with an angular portion that mates with a corresponding angular portion of a bushing.

BACKGROUND OF THE INVENTION

Tooling systems, including die and punch assemblies comprising a die set, are mounted in presses and are used for manufacturing numerous products and components of products. The die and punch assemblies are used to cut, punch holes in, shape, or otherwise form material, such as metal, cardboard, plastic, or other stock. The die assembly usually is in the lower or bottom position of the press and the punch assembly in the upper or top position, although the punch assembly may be on the bottom and the die assembly on top. The press, and the die and punch assemblies mounted therein, may be positioned horizontally, vertically, or at an angle. A "blank" of material to be formed, i.e., unshaped material, such as a flat sheet of cardboard or metal, passes between and is clamped by the die and punch and is held in place while the die and punch come together to form the material. The blanks pass between the "front sides" of the die and the punch assemblies, which are the sides facing the blank, as opposed to the "back sides," which are the sides of the die and punch assemblies facing away from the blank. The die and punch assemblies, or a series of die assemblies and punch assemblies, are activated to form the material into a product or a component of a product, such as a metal hub cap for a car, a paper cup or plate (i.e., pressware formation), or a plastic toy, by example only.

Both the die and the punch assemblies may have knockouts and bushings for holding the blank in place, assisting in the forming or shaping the material, and for knocking the formed product out of the die set. Knockouts commonly have round shafts or stems and may have hardened sleeves pressed into the main shaft diameter. The knockout shaft is slidably disposed within the bushing, which has a lumen or bore for receiving the knockout shaft. A split clamp is clamped around the shaft of the knockout on the back side of the die (the side opposing the front side that faces the blank), which holds the knockout in position relative to the bushing and prevents the knockout from over-extending and sliding out of the front side of the die upon activation. The knockout shaft typically has a reduced diameter at the split clamp location.

In a system having the die assembly as the bottom of the die set, the knockout is activated upwards by pressure (pneumatic, hydraulic, etc.) prior to insertion of the blank, so that the knockout extends upwards towards the blank on the front side of the die assembly. The knockout is fully extended when the split clamp reaches the bushing on the bottom side of the die assembly. When extended, the knockout supports the blank as it enters the die set and in conjunction with the punch assembly, clamps the blank on-center during the blank draw-in, and maintains the blank on-center as the punch assembly forms the product or component. After product formation, the die knockout is deactivated (i.e., the pressure is released) and the knockout slides away from the product, retracting into the bushing as the die set opens, so that the product is not damaged. If the product remains in the bottom half of the die set, the knockout may be reactivated to extend out of the die after the die set has reopened to eject or "knock out" the product and then retract in preparation for receiving the next blank. The knockout is activated upwards as the next blank enters the die set for product formation, and the process described above repeats itself.

The cycling rate of the knockout, meaning the rate at which the knockout extends and retracts or is activated and deactivated within the die assembly, varies with the particular tooling application. Typical values for pressware applications (i.e., the formation of paper plates, bowls, cups, etc.) under normal conditions is one cycle of the knockout every 1–2 seconds, where numerous cycles, in excess of 20 million, can be realized by the knockouts before replacement. Such cycling rates cause wear to the components. Accordingly, both knockouts and bushings usually are made of a strong metal, such as steel or iron, to aid in withstanding the wear. For example, knockouts may be comprised of 1018 steel, and bushings may be comprised of stainless steel, although other materials may be used.

Notwithstanding the strength of the metals, the die set components tend to wear out quickly, particularly the bushing, which is the main wear component. For example, bushings used for pressware applications typically wear out in a matter of three months. Furthermore, knockout shafts tend to break where the split clamp attaches at the portion of reduced diameter due to repeated cycling, heat, and/or excessive loads, such as when the activation pressure is set too high. This wear and breakage results in down time for replacing worn components as well as a loss in product quality as the components wear.

The wear is exacerbated when the press in which the knockout and bushing operate is positioned at an angle or vertically (i.e., the knockout moves horizontally), as opposed to horizontally (i.e., the knockout moves vertically). Even with typical knockout-to-bushing clearances, when the die set is positioned at an angle, the knockout can tip slightly in its extended position. Wear of the knockout or the bushing occurs along a linear portion of the knockout and the bushing due to the friction along the line of contact between the two components, where the linear contact is created by the effect of the angle of the press and gravitational forces. Such linear wear causes the knockout to tip further off-center, resulting in one side of the knockout being higher than the other when extended. As the blank is inserted into the die set, the un-centered knockout that should be supporting the blank may instead tip slightly and prevent the blank from being drawn in or properly aligning between the die and the punch assemblies. Furthermore, even if the blank is properly drawn into the die set, as the knockout retracts during the material formation process, the blank may be pulled slightly backwards. Worn knockouts and bushings tend to pull the material even further back, and visibly off-center, which disrupts the formation process and can adversely affect the quality of the product formed.

SUMMARY OF THE INVENTION

Accordingly, the present invention is directed to a tooling system in a press for forming a product from a blank of material disposed between a punch assembly and a die assembly and a method of using the same. The tooling system comprises a knockout and a bushing. The knockout further comprises a shaft having opposed ends, a plate fixed to one opposed end, and a tapered portion. The bushing is supported by one of the punch and die assemblies and defines a lumen configured to slidably receive the shaft for axial movement between an extended position and a retracted position. The lumen has a tapered receiving section at one end thereof configured to mate with the tapered portion of the knockout when the shaft is in the extended position.

The present invention is also directed to a method of operating an improved knockout in a press for forming a product from a blank of material disposed between a punch assembly and a die assembly. The method of operating the improved knockout comprises slidably supporting a shaft having opposed ends in a lumen defined by a bushing configured in one of the punch and die assemblies; selectively moving the shaft axially between an extended position and a retracted position; supporting the blank with a plate fixed to a first end of the shaft during movement of the shaft from the extended position to the retracted position; knocking out the product from the die assembly during movement of the shaft from the retracted position to the extended position; and symmetrically engaging a tapered portion fixed to a second end of the shaft with a tapered recess in the bushing when the shaft is in the extended position.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate the various features and aspects of the tooling system and its method of use in a tooling procedure, and together with the description serve to explain the principles of the invention.

FIGS. 2a and 2b are perspective views of the front side and the back side of the die assembly, respectively, and FIG. 2c illustrates a cross-sectional view of the die assembly in the position of FIGS. 2a and 2b.

FIGS. 3a and 3b are perspective views of the front side and the back side of the die assembly, respectively, and FIG. 3c illustrates a cross-sectional view of the die assembly in the position of FIGS. 3a and 3b.

FIGS. 5a and 5b are cross-sectional and front plan views of an exemplary bushing with a square shaft receiver used in a tooling system for guiding the tapered knockout in FIG. 4, consistent with the present invention.

FIGS. 6a and 6b are cross-sectional and front plan views, respectively, of another exemplary tapered knockout with a round shaft used in a tooling system, and FIG. 6c is a section through the piece of the tapered knockout in FIGS. 6a and 6b, consistent with the present invention.

FIG. 8a illustrates a knockout with a cone-shaped tapered portion; FIG. 8b illustrates another knockout with a cone-shaped tapered portion; FIG. 8c illustrates a knockout with an obelisk-shaped tapered portion; and FIG. 8d illustrates a knockout with a pyramid-shaped tapered portion.

FIGS. 9a–9d illustrate cross-sectional portions of exemplary tooling systems consistent with the present invention. FIG. 9a is a partial cross-section of an embodiment of an unused knockout and bushing of the present invention. FIG. 9b shows the partial cross-section of the knockout and bushing of FIG. 9a after being operated at an angle, and illustrates wear to the tapered knockout and bushing. FIG. 9c is a partial cross-section of another embodiment of an unused knockout and bushing of the present invention. FIG. 9d shows the partial cross-section of the knockout and bushing of FIG. 9c after being operated at an angle, and also illustrates wear to the tapered knockout and bushing.

FIG. 10a is a partial cross-section of an embodiment of an unused knockout and bushing of the present invention. FIG. 10b shows the partial cross-section of the knockout and bushing of FIG. 10a after being operated vertically, and illustrates wear to the tapered knockout and bushing.

DESCRIPTION OF THE PRESENT INVENTION

Reference will now be made in detail to implementations of the tooling system as illustrated in the accompanying drawings. Wherever possible, the same reference numbers will be used throughout the drawings to refer to the same or like parts.

FIGS. 1–10 illustrate preferred embodiments and components of a tooling system, consistent with the present invention. Advantages of the tooling system of the present invention are described herein and are illustrated in the accompanying drawings. For example, the tapered knockout does not require a split clamp, thus the diameter of the knockout shaft is not reduced to accommodate the split clamp. As a result, shaft breakage that presently occurs at the stress point of the reduced diameter after a short period of use is avoided. Furthermore, the tooling system is self-centering and self-leveling and reduces wear on the bushing and knockout, thereby improving product formation. These advantages will become apparent in discussing the structure and operation of the tooling system.

Structure of Tooling System

Figure 1:
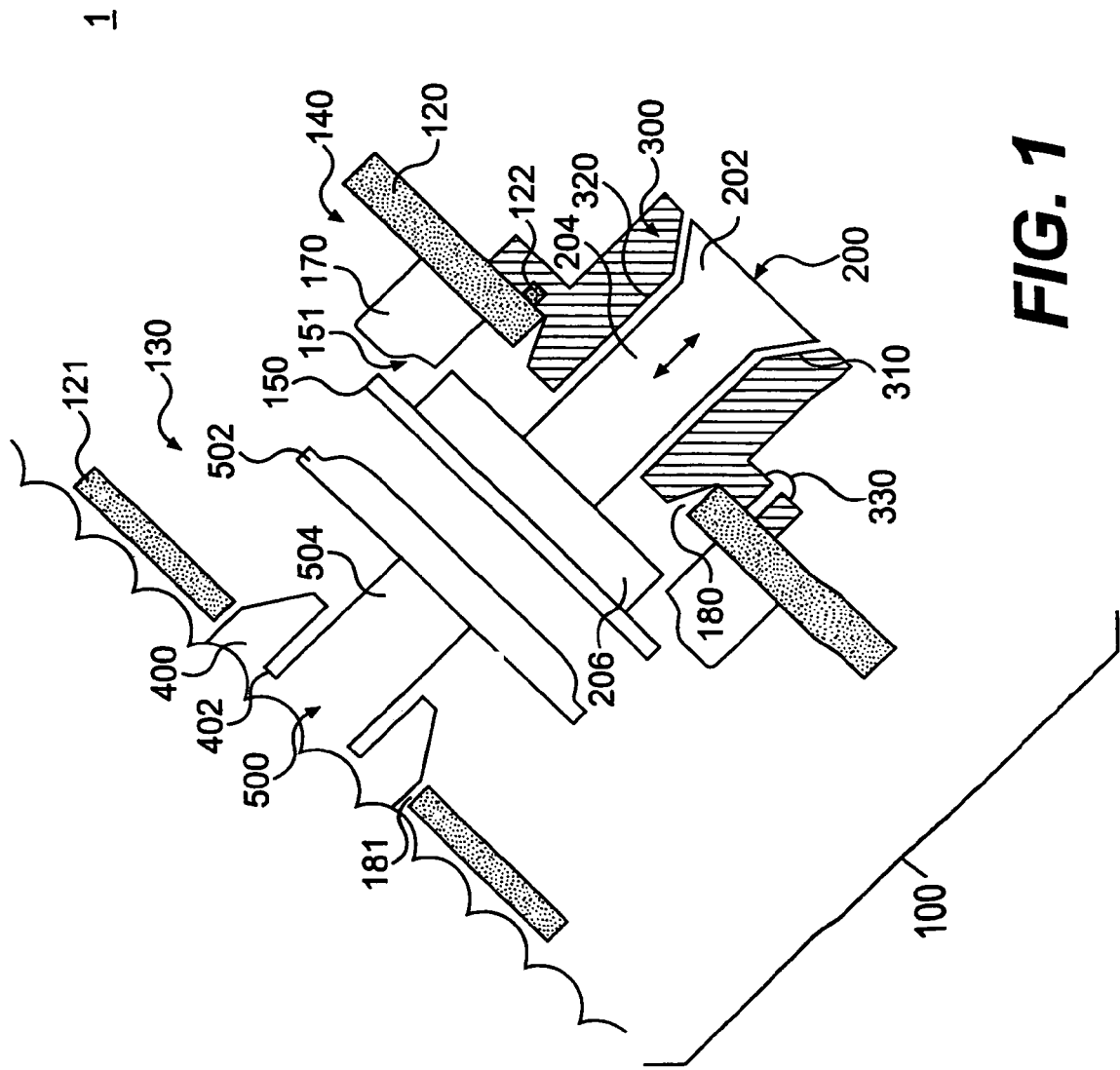
FIG. 1 illustrates a cross-sectional view of a press including a tooling system having a die assembly with a tapered knockout and a bushing and a punch assembly, consistent with the present invention.

FIG. 1 illustrates an exemplary press 1 containing tooling system 100, including a die assembly 140 and a punch assembly 130. Press 1 is shown at approximately a 45 degree angle, but press 1 may be situated horizontally, vertically, or at any angle between horizontal and vertical. Due to gravity, however, wear on tooling system 100 is increased when press 1 is situated vertically or at an angle so that knockout 200 extends and retracts within press 1 horizontally or at an angle.

Tooling system 100 draws in a blank 150 of material to be formed by the punch assembly 130 and die assembly 140. Blank 150 may be paper, cardboard, metal, plastic, or any other material suitable to be molded or formed. Blank 150 may be drawn into tooling system 100, dropped into tooling system 100 by gravity, such as when press 1 is positioned horizontally or at an angle, or otherwise presented to tooling system 100. Punch and die assemblies 130, 140 then mold blank 150 into a member, such as or product or component, and tooling assembly 100 kicks or knocks the formed product out in preparation for receiving another blank 150, as will later be described with respect to the operation of tooling system 100. It is to be understood that delivery systems that deliver the blanks to the tooling system, and removal systems that remove the molded members after the tooling system knocks them out, are beyond the scope of the present invention.

Exemplary punch assembly 130 includes a base 121, a bushing 400, and a punch 500. Punch assembly 130 may also include a driving system (e.g., mechanical cam, pneumatic, hydraulic, not shown) to cause punch 500 to reciprocate within bushing 400. Bushing 400 is mounted to plate 121 through a hole 181 in plate 121. Bushing 400 is configured to support punch 500 if punch 500 is static, and to guide punch 500 if it is active, i.e., the driving system causes punch 500 to reciprocate within bushing 400. Punch 500 includes a punch shaft 504 connected to a punch plate 502. Punch shaft 504 and punch plate 502 may be of any shape, depending on the tooling application. For example, in pressware applications for paper plate formation, punch plate 502 is round. Bushing 400 has a lumen 402 configured to match the shape of punch shaft 504. All components of punch assembly 130 may be made of various rigid and strong materials, including, but not limited to, metals such as steel, ductile iron, or titanium (if weight reduction is a concern).

Figure 2A:
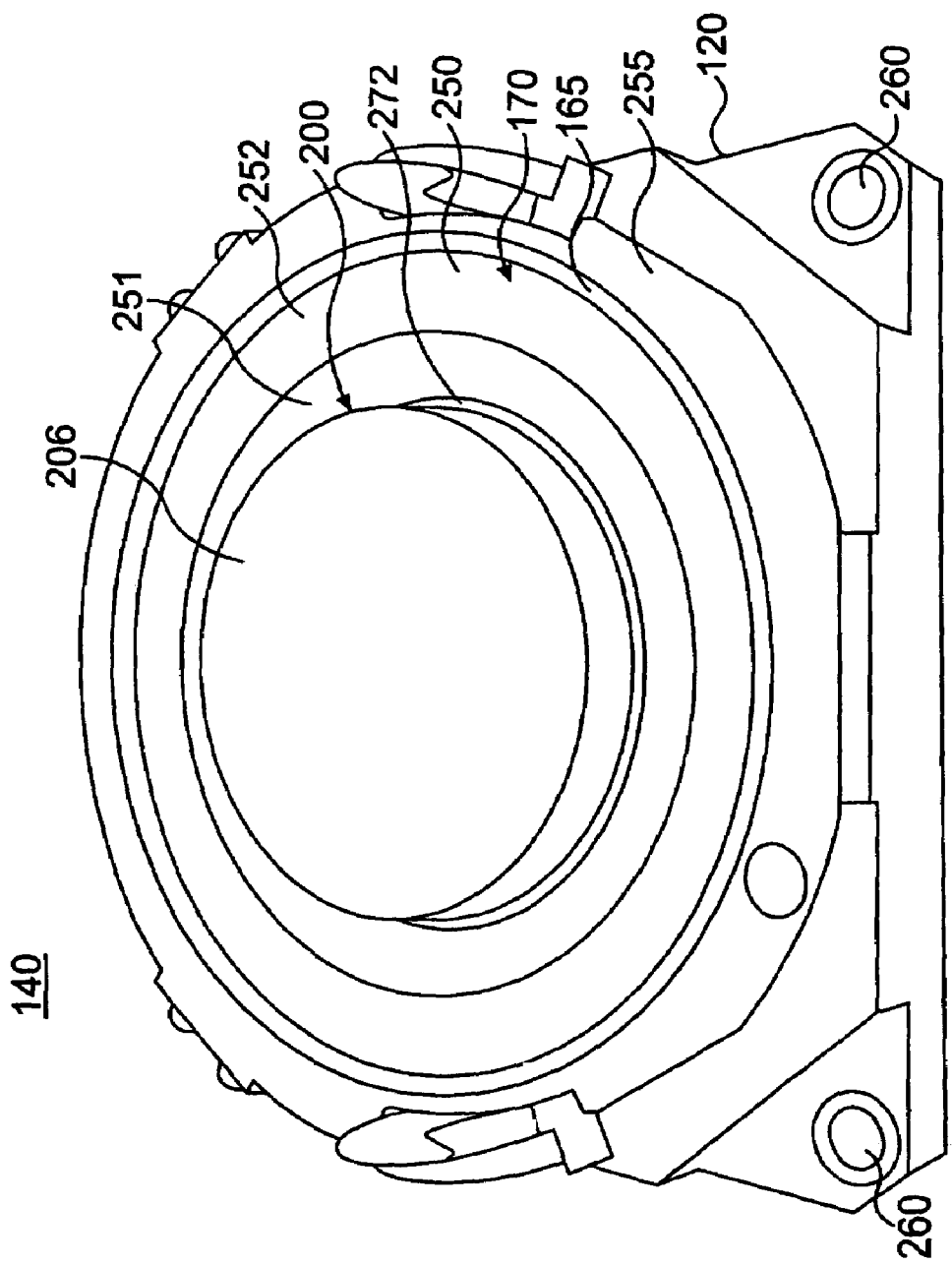
FIGS. 2a–2c illustrate an exemplary die assembly wherein a tapered knockout is extended, consistent with the present invention.
Figure 2B:
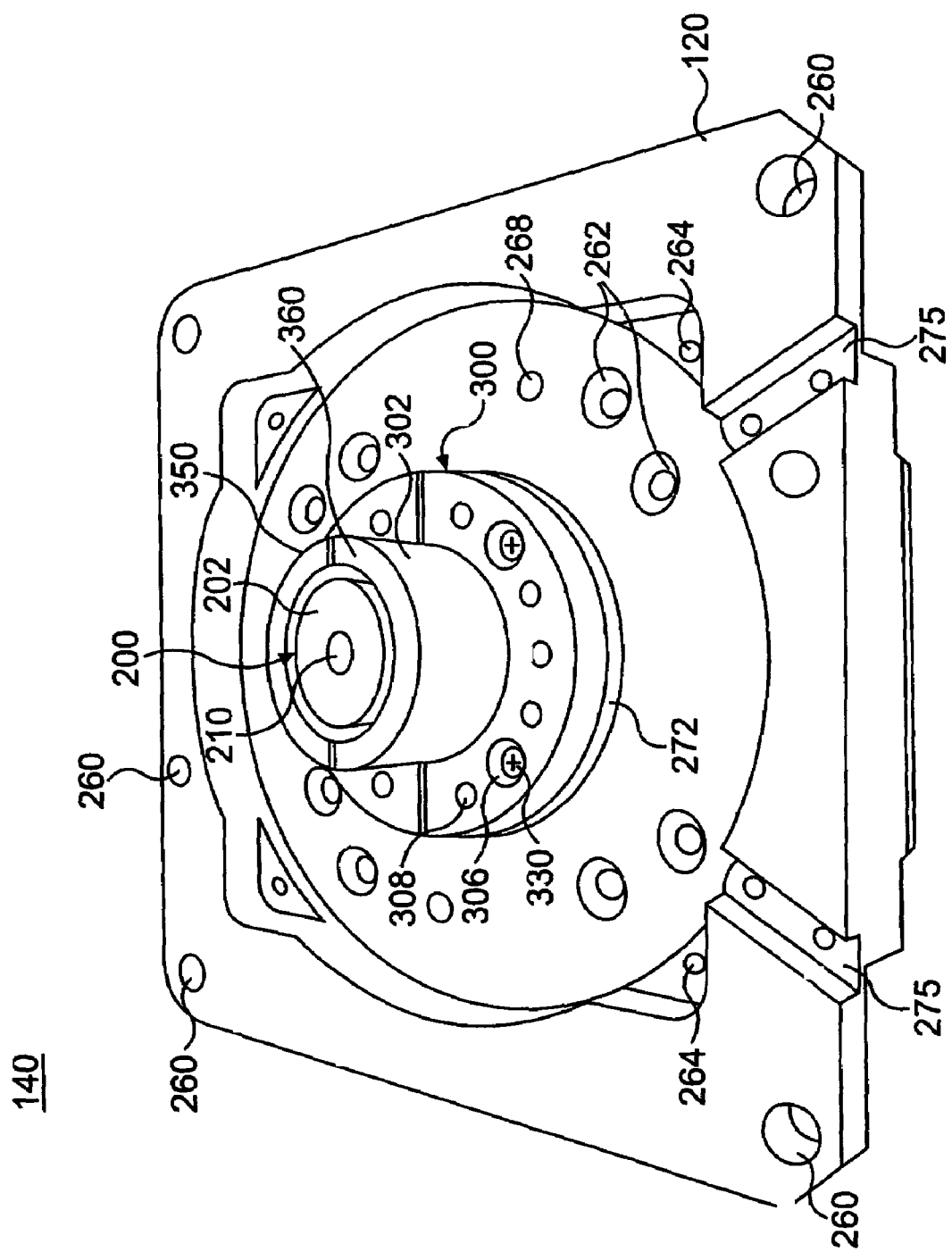
Figure 3A:
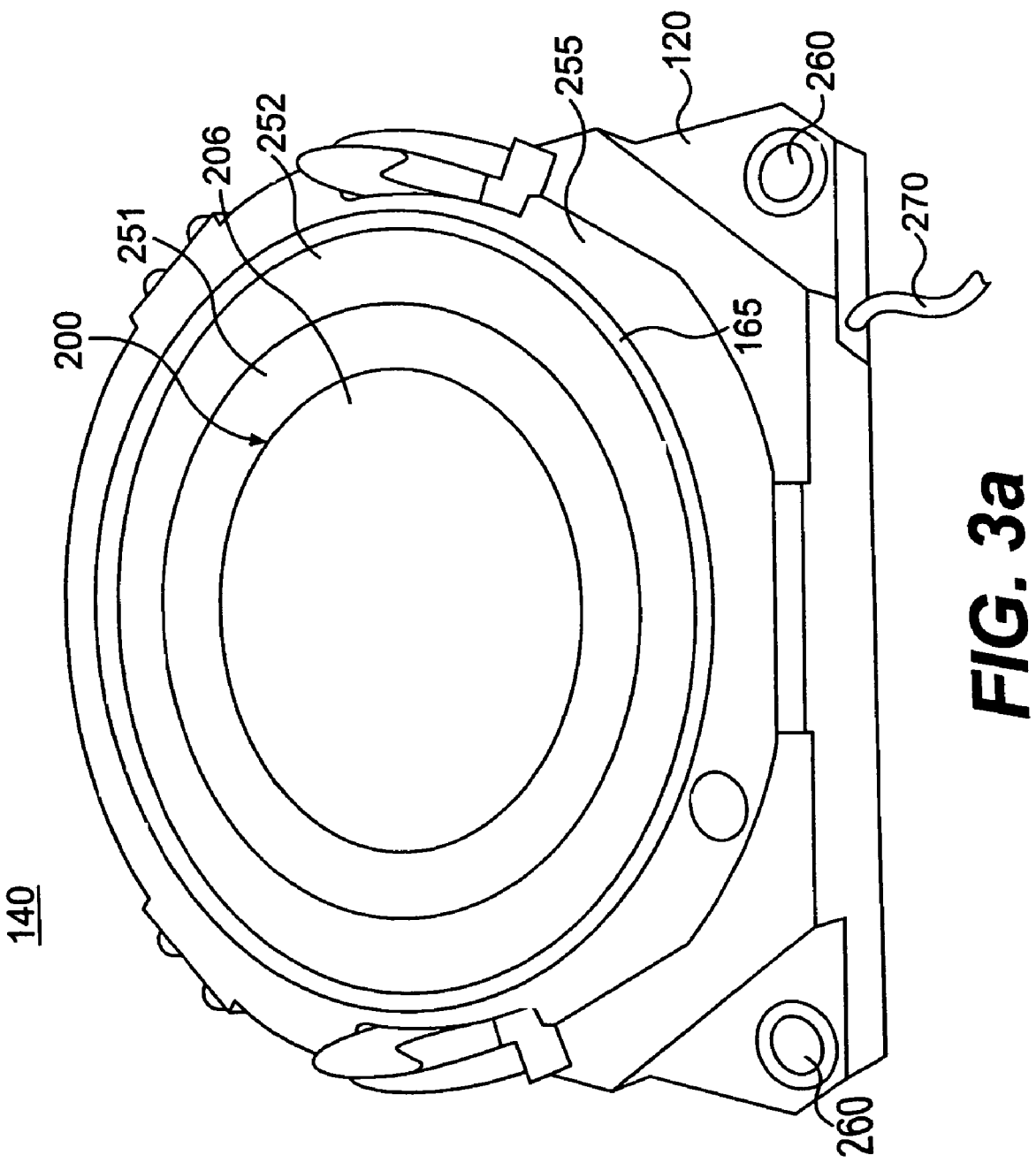
FIGS. 3a–3c illustrate an exemplary die assembly wherein a tapered knockout is retracted, consistent with the present invention.
Figure 3B:
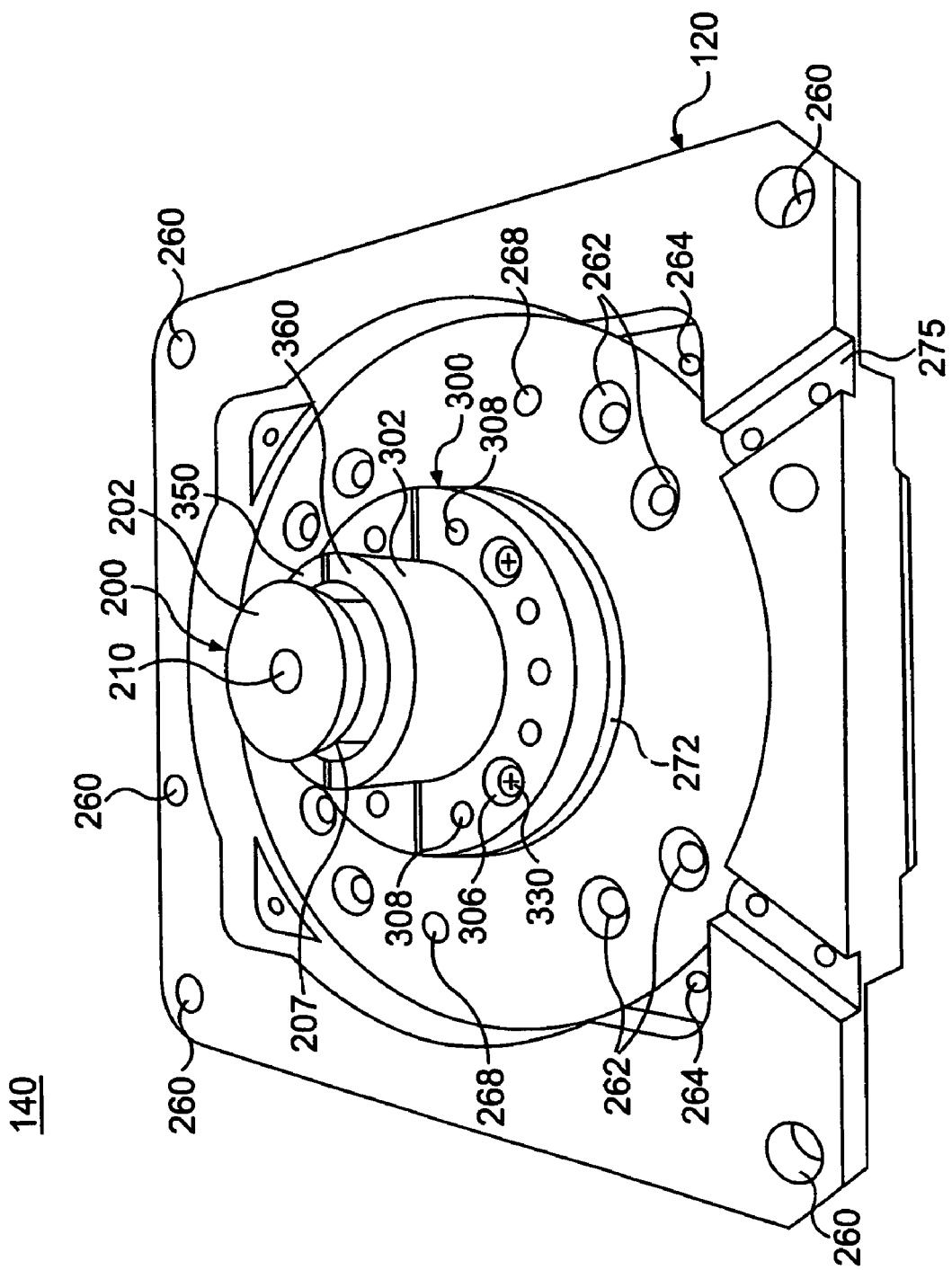
Figure 2C:
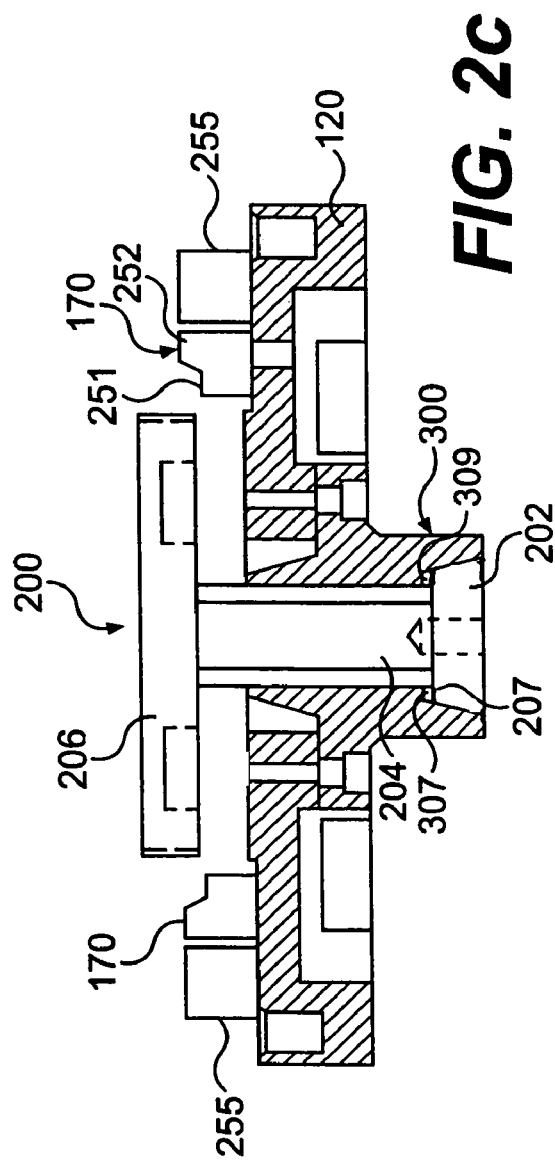
Figure 3C:
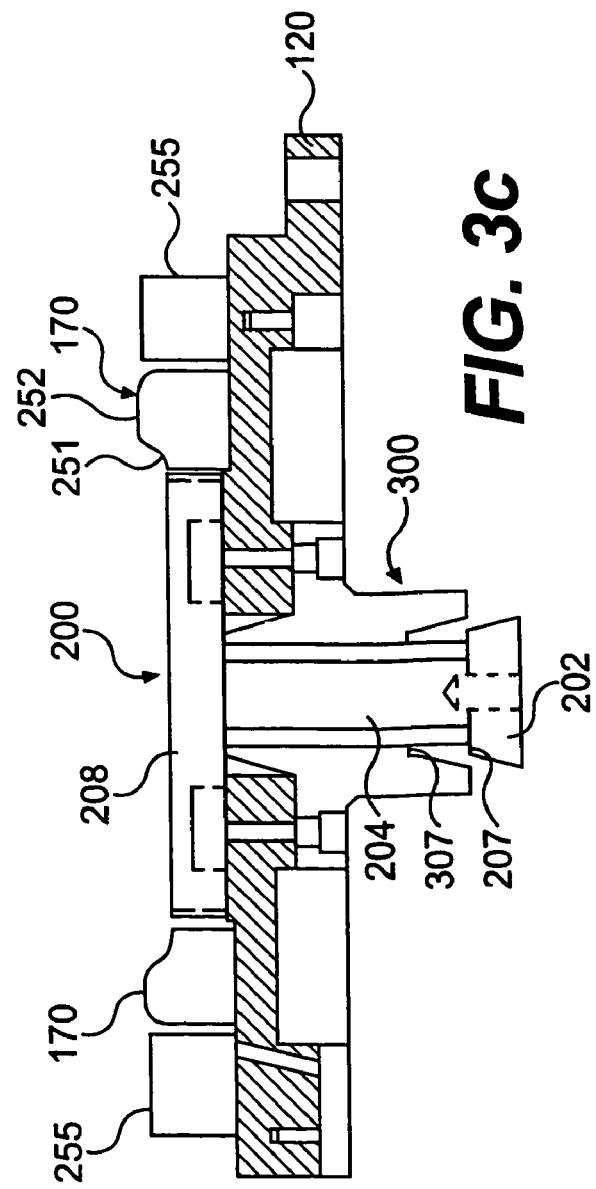

Die assembly 140 is configured to mate with punch assembly 130 to form products, such as paper plates, as shown in FIG. 1. Die assembly includes a base 120, a die 170, a die support 255, a tapered knockout 200, and a bushing 300, as shown in FIGS. 2 and 3. FIGS. 2a and 2b show perspective views of the front and back sides, respectively, of an embodiment of die assembly 140 of tooling system 100, and FIG. 2c shows a cross-sectional view, wherein tapered knockout 200 extends out of die 170. FIGS. 3a–3b show the front and back sides, respectively, of an embodiment of die assembly 140, and FIG. 3c shows a cross-sectional view, wherein tapered knockout 200 retracts and is flush with die 170. These components of die assembly 140 may be made of similar rigid and strong materials as those of punch assembly 130, including but not limited to metals such as steel, ductile iron, or titanium (if weight reduction is a concern).

Base 120 (FIG. 1) is mounted within press 1 through mount holes 260. Base 120 supports or mounts bushing 300 and die 170, and may be of any suitable shape. A hole 180 is cut in base 120 for inserting portions of bushing 300 and knockout 200. Base 120 may have one or more dowel pins 122 (FIG. 1) to align bushing 300 and to secure bushing 300 to base 120 or may have screws 330 or an alternative attachment mechanism. Base 120 (FIG. 2) also has mount holes 262 and 264 (FIGS. 2b, 3b) for similarly securing die 170 and die ring 255, respectively, to base 120. Vents 268 in base 120 allow venting of steam, heat, or air. As shown in FIGS. 2b and 3b, the back side of base 120 has grooves 275 to accommodate wires or cables 270 (FIG. 3a).

Die 170 is mounted to base 120 through mount holes 262 and is the component of die assembly 140 that works in conjunction with punch plate 502 to form a member. In the embodiment of die assembly 140 shown in FIGS. 2–3, die 170 is round and has a rim portion 252 and a groove portion 250 suitable for forming paper plates. However, die 170 may be of any size or shape or configuration suited to the particular tooling application in which it is used. Die base 120 also has a hole 272 through which tapered knockout 200 is operable to project, where hole 272 is configured to match the size and shape of knockout plate 206.

Die support 155 is mounted on base 120 and surrounds die 170. Die support 255 has a lumen (not shown) configured to accommodate die 170. Once die 170 is disposed in the lumen of support 255 and they are mounted on base 120, a gap 165 is formed between die support 255 and die 170.

Tapered knockout 200, shown in more detail in FIGS. 4 and 6, is disposed in bushing 300. Tapered knockout 200 includes a tapered portion 210 formed or attached to the end of a shaft 204, 205 and a knockout plate 206 attached to the opposite end of shaft 204, 205. Tapered portion 202 also has a hole 202 extending into shaft 204, 205 for insertion of a knockout rod for activating tapered knockout 200 in conjunction with the drive system (not shown), the activation of which is known in the art and is beyond the scope of this invention.

Figure 4B:
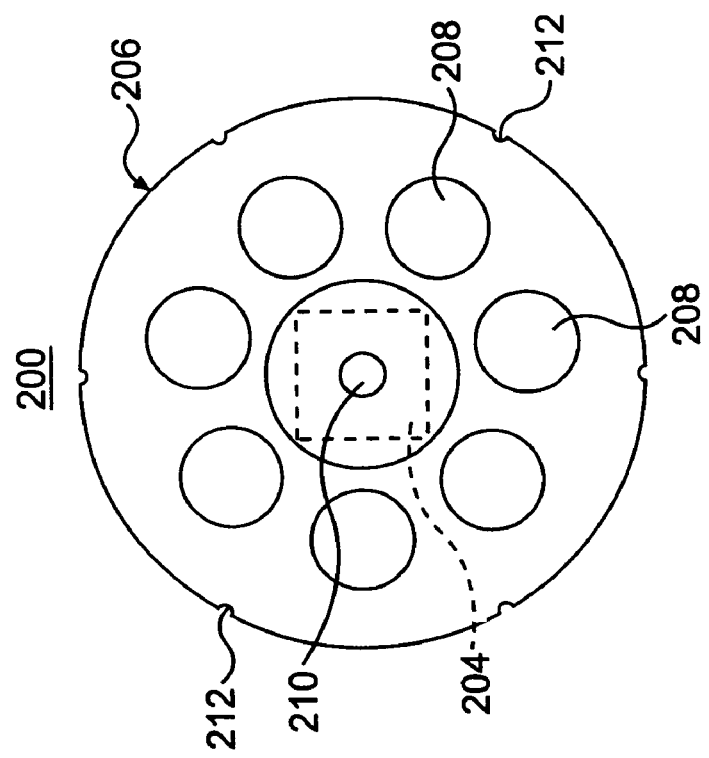
FIGS. 4a and 4b are cross-sectional and front plan views, respectively, of an exemplary tapered knockout with a square shaft used in a tooling system.
Figure 4C:
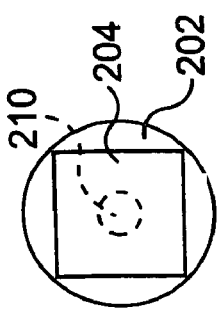
FIG. 4c is a section through the piece of the tapered knockout in FIGS. 4a and 4b, consistent with the present invention.
Figure 4A:
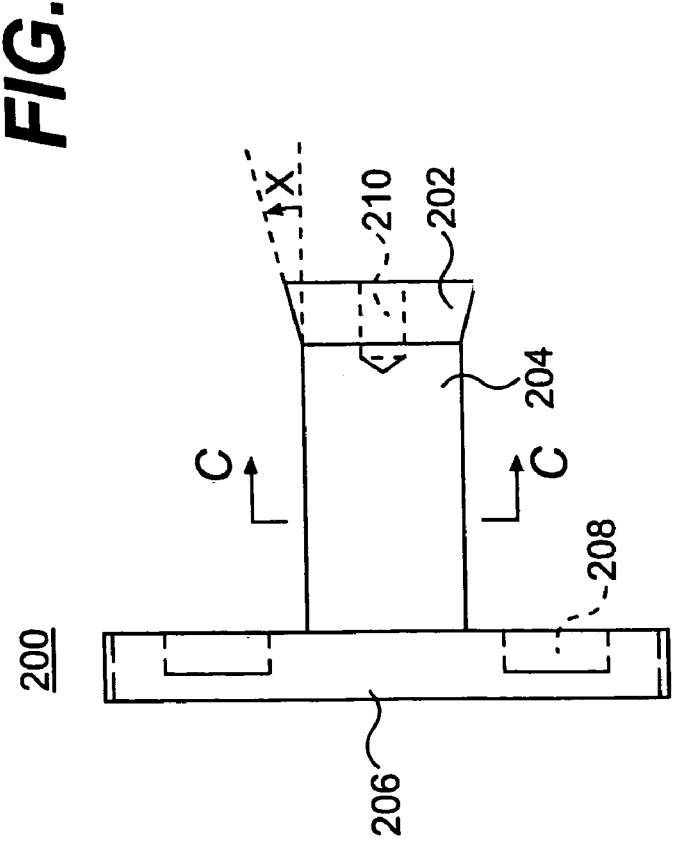
Figure 7B:
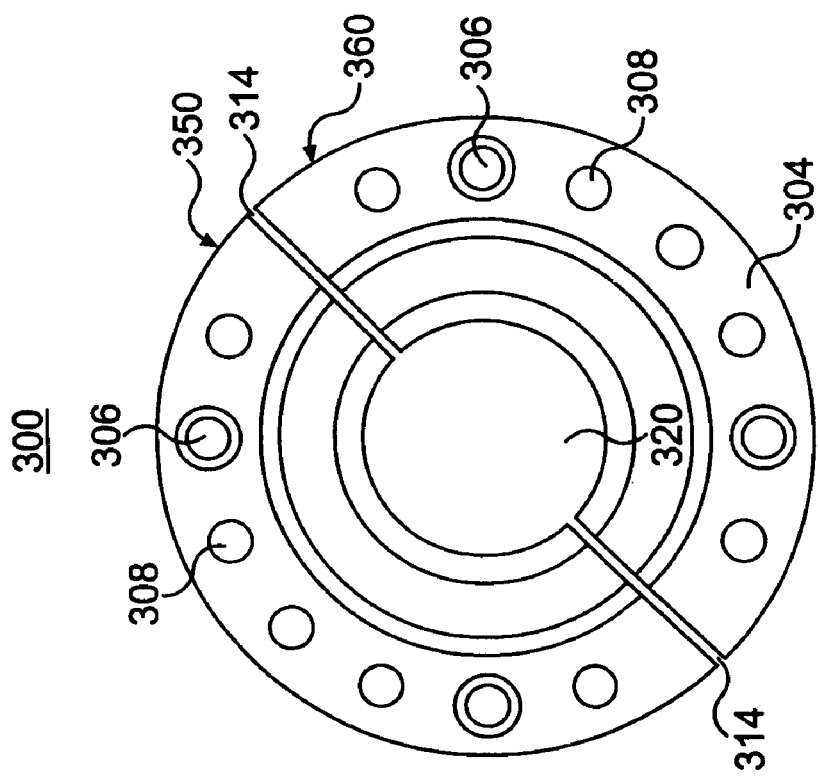
FIGS. 7a and 7b are cross-sectional and front plan views of another exemplary bushing with a round shaft receiver used in a tooling system for guiding the tapered knockout in FIG. 6, consistent with the present invention.
Figure 7A:
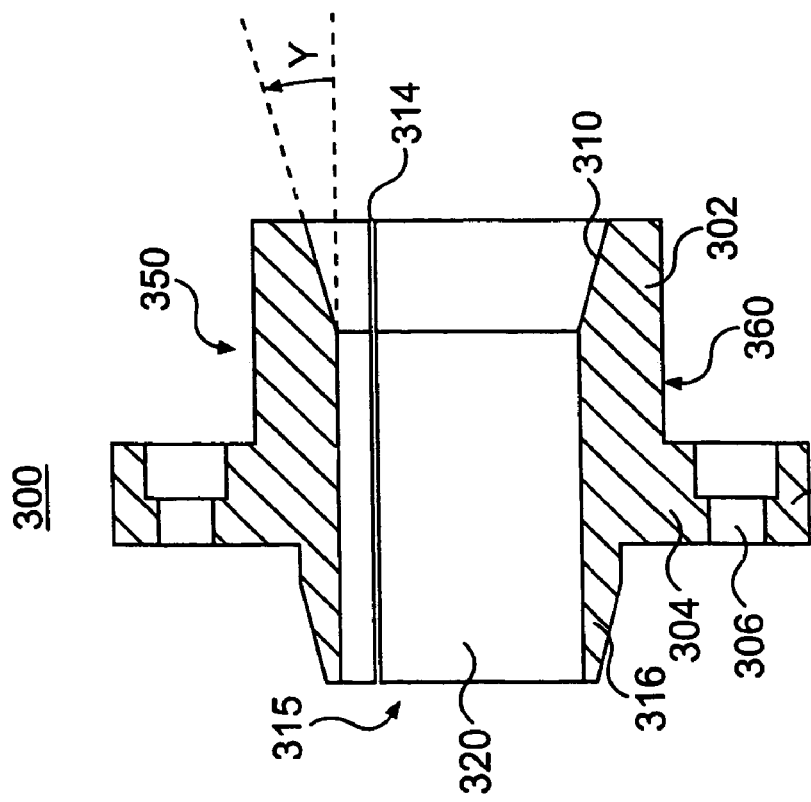
Figure 8B:
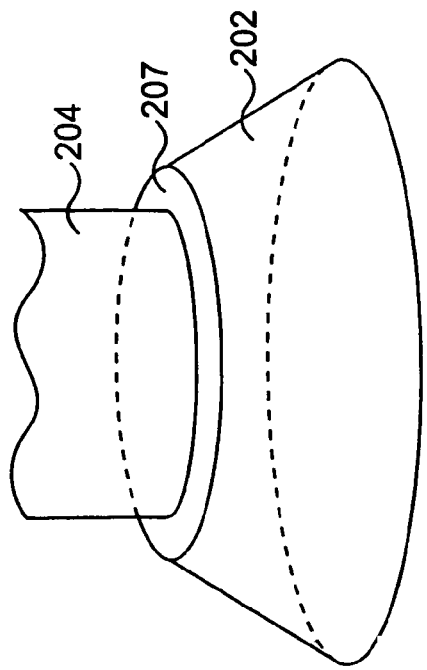
FIGS. 8a–8d illustrate perspective views of a portion of exemplary tapered knockouts employed in a tooling system, consistent with the present invention.
Figure 8D:
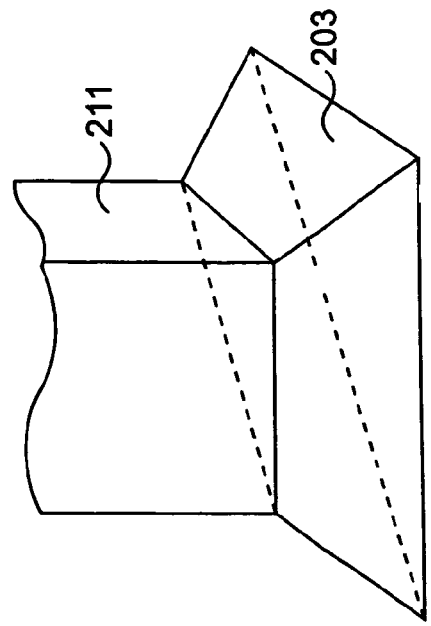
Figure 8A:
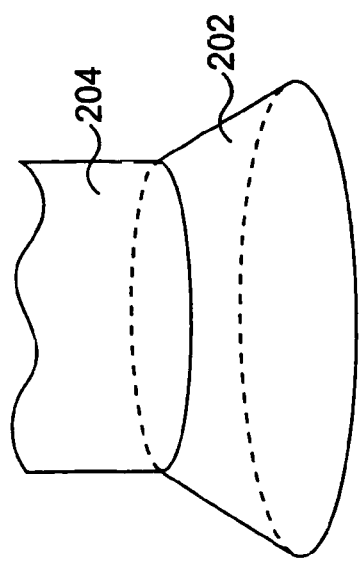
Figure 8C:
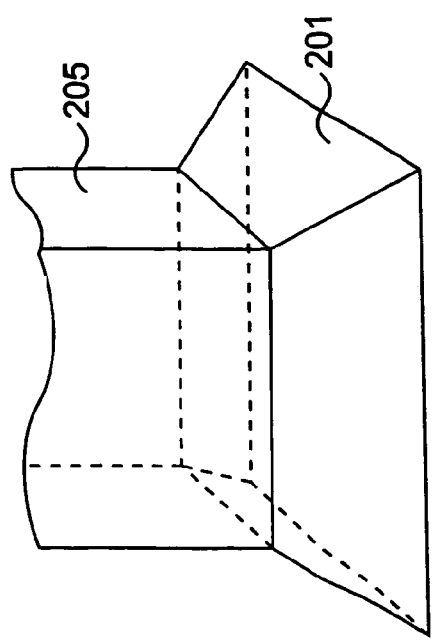

FIGS. 4a and 6a illustrate cross-sectional views of tapered knockout 200 having square shaft 204 and round shaft 205, respectively, consistent with the present invention. Notably, however, shaft 204, 205 may be any symmetrical shape, such as a triangle-shaped shaft 211 (FIG. 8d). Aside from the shape of shaft 204, 205, the knockouts illustrated in FIGS. 4a–4c (square) and 6a–6c (round) are otherwise structurally the same. The difference between shafts 204 and 205 will be discussed in relation to the operation of tooling system 100. Shaft 204, 205 may be of any size (in terms of width for a square shaft or diameter for a round shaft) and length. The width and length is dependent upon, among other things, the tooling application, the depth of the product being formed, the forming base material, the size of knockout plate 206 that shaft 204, 205 supports, the draw-in location for blank 150 supported by knockout plate 206, and the length of bushing 300 that guides shaft 204, 205. The width or diameter of shaft 204, 205 is generally uniform, and there is no portion at which the width or diameter of shaft 204, 205 is significantly reduced.

Tapered portion 202 is configured as a symmetrical taper-shape and is coupled to or molded on the end of shaft 204, 205, 211. Exemplary shapes of tapered portion 202 are illustrated in FIGS. 8a through 8d, including conical 202 (FIG. 8a), conical 202 with a step 207 (FIG. 8b), obelisk 201 (FIG. 8c), and pyramid 203 (FIG. 8d). Any symmetrical shape having a portion that tapers directly into the shaft (FIGS. 8a, 8c, 8d), or tapers towards and forms step 207 with the shaft (FIG. 8b), and is centered with respect to the shaft, is adequate for the present invention. Moreover, tapered portion 201, 202, 203 is in no way limited to the shapes depicted in FIGS. 8a–8d. Similarly, the shaft may be round 204 (FIGS. 8a, 8b), square 205 (FIG. 8c) or triangular 211 (FIG. 8d), or any other symmetrical shape that is centered with respect to tapered portions 201, 202, and 203.

The angle (denoted as "x") of the tapered portion 202 illustrated in FIGS. 4a and 6a is approximately 15 degrees with a preferred range of between 5 degrees and 45 degrees, although angles as small as 5 degrees and as large as 85 degrees are consistent with the present invention. The size (i.e., the smallest area or diameter of tapered portion 202 along a length) of tapered portion 202 may be the same as the size (i.e., width or diameter) of shaft 204, 205 to which it attaches or is formed. Alternatively, as shown in FIGS. 2c, 3c, 8b, 9c, and 9d, the smallest area or diameter of tapered portion 202 along a length of tapered portion 202 may be larger than the size, (i.e., width or diameter) of shaft 204, 205 to which it attaches or is formed, such that the top of tapered portion 202 forms step 207 with shaft 204, 205. The length of tapered portion 202 varies, depending on, among other factors, the tooling application, the length of shaft 204, 205, and characteristics of bushing 300 that guides shaft 204, 205 and mates with tapered portion 202. There is no limitation or preferred range for the length or size of tapered portion 202, the ratio of the shaft length to the taper length, or other such measurements.

Knockout plate 206, which is attached to the opposite end of shaft 204, 205 from tapered portion 202, is shown in detail from the front in FIGS. 4b and 6b. The size (i.e., diameter or width) and shape of knockout plate 206 varies with the tooling application, and is illustrated as a disk for pressware applications as an example only. Knockout plate 206 may include cutouts 208, which are recessed areas that are cut out of knockout plate 206 for weight reduction purposes. By decreasing the weight of knockout plate 206, the stress and wear on tooling system 100 is also reduced. Although cutouts 208 are circular in the illustration, they may be of any shape, or in the form of a groove or other cutout, such that the weight of knockout plate 206 remains evenly distributed and centered. Knockout plate 206 also includes grooves 212 along its sides. Grooves 212 permit heat, air, and/or steam to vent. Grooves 212 are optional and exemplary only, and may be replaced by holes drilled in knockout plate 206, or some other venting mechanism.

Bushing 300, which guides tapered knockout 200, is illustrated in more detail in FIGS. 5 and 7. Bushing 300, which is separable into two symmetrical sections, a first bushing section 350 and a second bushing section 360, is mounted to base 120 by attachment plate 304 to define a lumen 315 having a shaft receiver 320, 321 and a tapered receiving section or tapered receiver 310.

First and second bushing sections 350 and 360 form bushing 300 when each section 350, 360 is fitted into die base hole 180 and is attached to die base 120 around tapered knockout 200, as shown in FIGS. 1–3. Each section 350, 360 has a half of attachment plate 304 and is configured with a half of tapered receiver 310 and shaft receiver 320, as shown in FIGS. 5 and 7. When attachment plate 304 for each bushing section 350, 360 is attached to die base 120, gaps 314 are formed between bushing sections 350 and 360. Bushing 300 is formed as two separate sections in order to dispose tapered knockout 200 in bushing 300, as will be described with respect to the installation of tooling system 100 in the operation section.

Attachment plate 304 is configured to secure bushing 300 (i.e., bushing sections 350, 360) to the bottom of base 120 (illustrated in FIGS. 1, 2b, and 3b). However, attachment plate 304 could also be secured to the front side of base 120.

As shown in FIG. 1, attachment plate 304 may be aligned on dowel pins 122 via attachment holes 306 (shown in FIGS. 2 and 3), and may be secured to base 120 with screws 330 or a similar attachment device through attachment holes 306. Alternatively, bushing 300 may be otherwise secured to base 120, as long as bushing 300 is replaceable once worn. Attachment plate 304 also may have vents 308 to allow air, heat, and steam to escape. Attachment plate 304 and vents 308 are disk-shaped in FIGS. 5b and 7b, but may be any shape.

Attachment plate 304 also defines a back side 304 of bushing 300 that extends out of hole 180 from the bottom side of base 120 (FIGS. 1, 2b, 3b), and a front side 316 that extends into hole 180 (FIG. 1). When tapered knockout 200 is fully retracted, the bottom of knockout plate 206 rests on front side 316 of bushing 300 and the top of knockout plate 206 is flush with the bottom of groove 251 of die 170, as shown in FIGS. 3a and 3c.

Figure 9C:
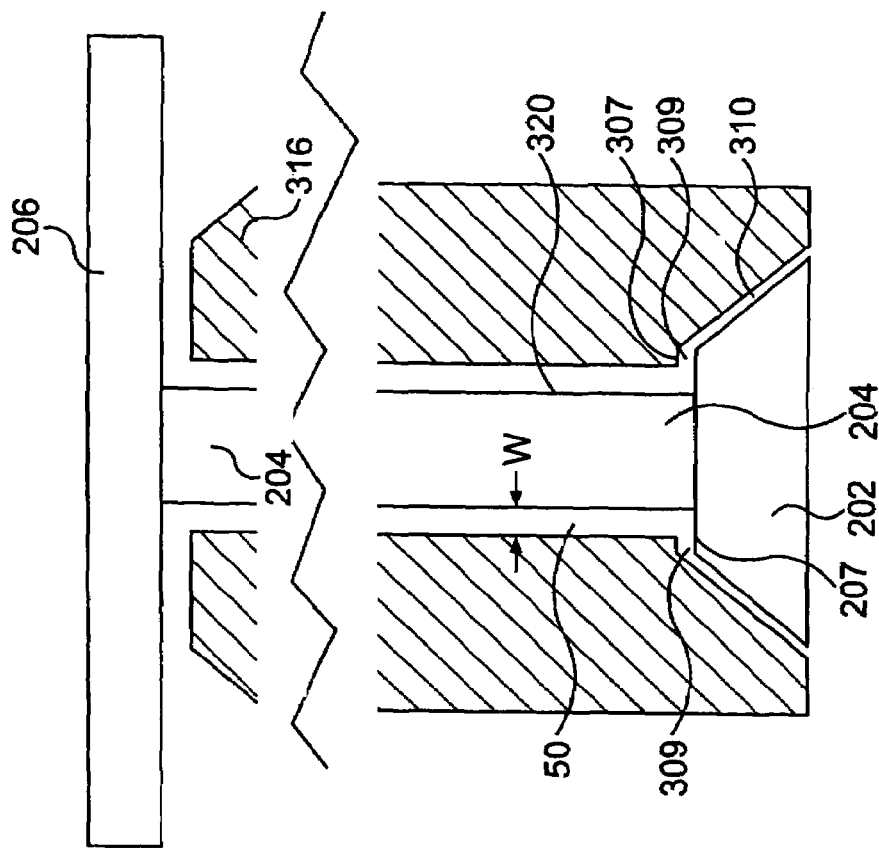

Tapered receiver 310, which is a tapered recess, is configured to mate with tapered portion 202, as shown in FIGS. 1, 9a–9d, and 10a–10b. The characteristics of tapered receiver 310, such as angle (labeled "y" in FIGS. 5a and 7a) and length, therefore are similar to those of tapered portion 202 (such as angle x, length). If tapered portion 202 forms step 207 in meeting with shaft 204, 205 as previously described, tapered receiver 310 also forms a step 307 in meeting with shaft receiver 320, as shown in FIGS. 2c and 9c.

As shown in FIGS. 9a–9d, a gap 309 is created at the juncture of the top of tapered portion 202 and the top of tapered receiver 310. For the embodiment in which tapered portion 202 tapers into shaft 204, as shown in FIGS. 9a–9b, the length of tapered receiver 310 (designated "$l_2$") is slightly shorter than the length of tapered portion 202 (designated "$l_1$"). For the embodiment in FIGS. 9c–9d in which step 207 is formed, the length of the length $l_2$ of tapered receiver 310 is longer than the length $l_1$ of tapered portion 202. The purpose of these length differences will be described with respect to the operation of tooling system 100.

Shaft receiver 320, 321, adjacent to tapered receiver 310, is a lumen or bore configured to match the size and shape of shaft 204, 205 of tapered knockout 200, as illustrated in FIGS. 2c, 3c, 5, and 7. In FIGS. 5a and 5b, shaft receiver 320 is square to correspond to square shaft 204 in FIGS. 4a–4c. Another exemplary bushing 300 with a round shaft receiver 321 is illustrated in FIGS. 7a and 7b, which corresponds with shaft 205 in FIGS. 6a–6c. Although these illustrations depict shaft receiver 320, 321 as square or round, shaft receiver 320, 321 is configured to match the shape of shaft 204, 205, which may be of any symmetrical shape. Aside from the shape of shaft receiver 320, 321, bushings 300 illustrated in FIGS. 5a–5b (square) and 7a–7b (round) are otherwise similar structurally. The difference between shaft receivers 320, 321 will be discussed in relation to the operation of tooling system 100. Regardless of the shape of shaft receiver 320, 321, it must be slightly larger than the width or diameter of the shaft disposed therein to permit the shaft to slide within it, and preferably is 0.004 to 0.007 inches larger than shaft 204, 205 before use has worn the components and increased the tolerance.

Operation of Tooling System

Generally speaking and as shown in FIG. 1, after tooling system 100 is installed in press 1, tapered knockout 200 and punch 130 are activated to form products or components from blanks 150. Installation of tooling system 100 occurs each time a component is worn and needs to be replaced. Given the reduced wear and the reduced effect of wear of tooling system 100, which will be discussed with respect to FIGS. 9 and 10, installation procedures do not have to be conducted as often in the present system.

FIGS. 1–3 serve to illustrate the installation of some of the components of tooling system 100. By example only, the installation of various components in die assembly 140 will be explained. To install tooling system 100 in press 1, die support 255 is mounted on base 120 and die 170 is inserted in die support 255 and secured to the front side of base 120. Tapered knockout 200 is inserted into hole 272 of die 170 and hole 180 from the front side of base 120, tapered portion-end first, so that shaft 204 projects through to the backside of die plate 120. Bushing sections 350, 360 are then placed around the projecting section of shaft 204 of tapered knockout 200 and bushing front side 316 is inserted onto dowel pin 122 from the backside of base 120, so that shaft receiver 320 surrounds shaft 204 on the back side of base 120. Attachment holes 306 of attachment plate 304 are then aligned with dowel pins 122 of base 120, and attachment plate 304 is secured to base 120 by inserting screws 330 into attachment holes 306 or by dowel pins 122. Alternative attachment mechanisms may also be used. Tapered knockout 200 is then connected to the driving system by a knockout rod to hole 210 in tapered portion 202. The driving system and its connection to tooling system 100, which is beyond the scope of the present invention, is configured to activate the knockout. Notably, any mechanism known in the tooling arts to activate the knockout may be used with the present invention. At this point, die assembly 140 and punch assembly 130 are installed and tooling system 100 is ready to operate.

In operation, tapered knockout 200 initially is in the retracted position, shown in FIG. 3. For example, in pressware applications, the top of knockout plate 206 is flush with the bottom of groove 251 of die 170 and the bottom of knockout plate 206 rests on bushing front side 316 when tapered knockout is fully retracted (FIG. 3a). Meanwhile, tapered portion 202 projects out of bushing back side 302, as shown in FIG. 3b.

When press 1 is activated, blank 150 is gravitationally or otherwise drawn into die set 160 between the front sides of die assembly 140 and punch assembly 130 in preparation for product formation (FIG. 1). Blank 150 is gripped between die assembly 140 and punch assembly 130 so that blank 150 remains centered and level. More specifically, upon activation, tapered knockout 200 moves upward, so that knockout plate 206 moves upward to support incoming blank 150 and prevents blank 150 from diving into cavity 151. Shaft receiver 320 of bushing 300 guides shaft 204 as it is activated upward by the driving system. Simultaneously, punch 500 moves downward, so that blank 150 is gripped between and held on center by punch 500 and knockout 200.

Eventually, tapered knockout 200 is fully extended and stops moving upward, as shown in FIG. 2. At this point, the bottom of tapered portion 202 is flush with the bottom of back side 302 of bushing 300 (FIG. 2b), tapered portion 202 mates with tapered receiver 310 (FIG. 2c), and knockout plate 206 projects out of hole 272 of die 170 (FIGS. 2a, 2c) and is level with incoming blank 150 (FIG. 1).

Tapered knockout 200 is then deactivated and retracts to its initial position described above as punch 130 activates to extend punch plate 502 downward to mate with die 170 and mold blank 150 into a member.

Many tooling applications require the knockout to then reactivate before another blank 150 is inserted into tooling system 100 in order to "knock out" the formed member from die assembly 170. Tapered knockout 200 is activated again, in the manner described above, and again fully extends out of die 170 to knock the product out of tooling system 100 in preparation for receiving another blank 150 and performing another cycle.

Referencing FIGS. 1, 2 and 3, a pressware application serves to illustrate the operation of tooling system 100. Tooling system 100 is activated so that tapered knockout 200 extends upward out of die 170 until fully extended. Cardboard blank 150 is drawn in and rests on knockout plate 206. Knockout plate 206 then retracts until it is flush with die 170 as punch plate 502 extends and mates with die 170 to form blank 150 into a paper plate with a rim. Once the plate is formed, tapered knockout again extends upward to knock the paper plate out of tooling system 100 in preparation for receiving another cardboard blank 150.

Operating tooling system 100 creates friction between the contact points of tapered knockout 200 and bushing 300, which causes wear to the components over numerous cycles. Although bushing 300 and tapered knockout 200 do indeed wear with use, the structure of tooling system 100 reduces wear and the effect of wear on product formation. Tapered portion 202 replaces the function of the split clamp used in current systems, which requires a reduced shaft diameter and leads to shaft breakage at the reduced diameter. The structure of tooling system 100, including tapered portion 202 and tapered receiver 310, also ensures that tooling system 100 is self-centering and self-leveling when extended, even as it wears, thereby improving product formation.

The structure of tooling system 100 prevents tapered knockout 200 from sliding out of die assembly 140 without requiring a reduced diameter or size of shaft 204, thereby avoiding shaft breakage at the reduction points. Shaft 204 is generally of uniform width or diameter, while the diameter of tapered portion 202 is larger than the width or diameter of shaft 204. The diameter of tapered receiver 310 is larger than the width or diameter of shaft receiver 320, so that tapered portion 202 mates with and stops at tapered receiver 310 when tapered knockout 200 is fully extended. Moreover, as previously discussed with respect to FIGS. 9a–9d, the length of tapered receiver 310 differs from that of tapered portion 202 so that a gap 309 is formed at the junction of the top of tapered portion 202 with tapered receiver 310. Thus, when knockout 200 is fully extended, the top of tapered portion 202 does not come into contact with tapered receiver 310.

Although the shaft may be of any shape, as previously described, shaft shapes that increase the surface area of contact between the shaft and the shaft receiver tend to create a less detrimental effect on product formation quality as they wear. The greatest wear occurs during extension and retraction of tapered knockout 200 along the line of contact between the shaft surface of the knockout and the shaft receiver surface of the bushing. When operated in an angled press 1 (FIG. 1), the contact between round shaft 205 (FIG. 5) and shaft receiver 321 (FIG. 7) is linear, and the components wear more quickly. In contrast, the contact between square shaft 305 (FIG. 4) and square shaft receiver 320 (FIG. 6) is along the flat surfaces of one side of shaft 204 and shaft receiver 320, which does not wear the components as quickly because the load is distributed more evenly. Although square shaft is therefore preferable to shafts of some other shapes, such as round shaft 205, shafts of any shape may be used in tooling system 100 because tapered portion 202 provides tooling system 100 with self-leveling and self-centering characteristics in spite of the wear on tapered knockout 200 and bushing 300, as will be discussed.

Figure 9D:
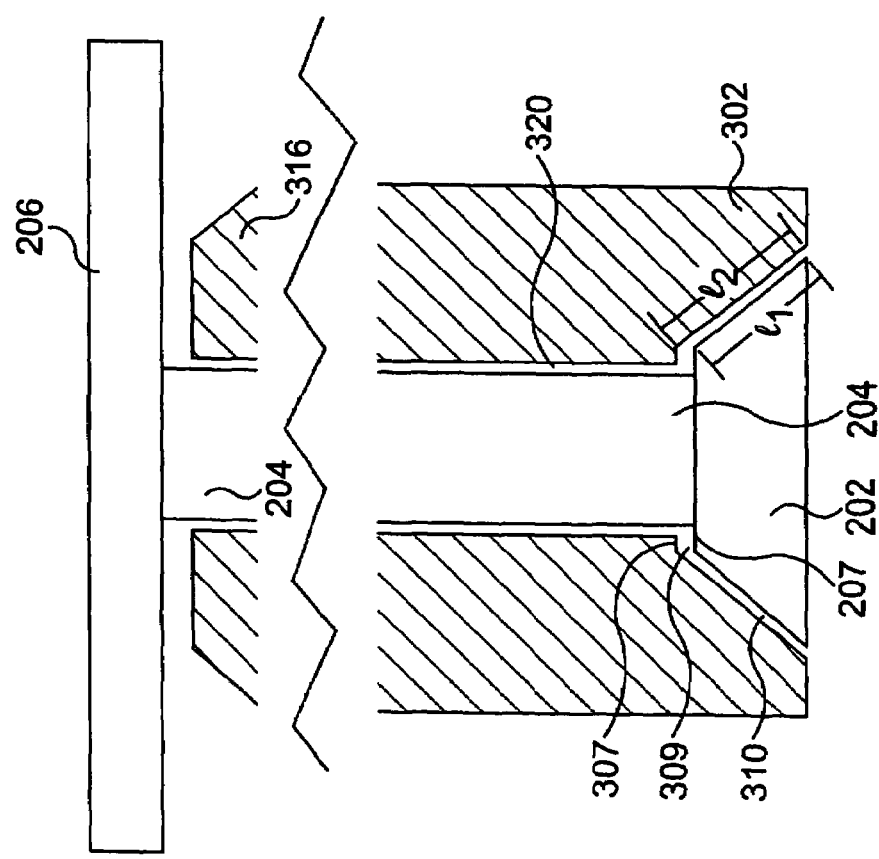

FIGS. 9a–9d and 10a–10b illustrate that knockout plate 206 remains level and centered because of the structure of tooling system 100, despite wear on knockout shaft 204 and shaft receiver 320. FIG. 9a illustrates a partial cross-section of an embodiment of tooling system 100 when new, and FIG. 9b illustrates the same cross-section after tooling system 100 has been operated in angled press 1 (shown in FIG. 1). Tapered portion 202 mates with tapered receiver 310 when tapered knockout 200 is fully extended out of die 170, creating gap 309 at the top of the juncture due to the fact that the length $l_1$ of tapered portion 202 is longer than that of tapered receiver 310 ($l_2$). Similarly, FIG. 9c illustrates a partial cross-section of another embodiment of tooling system 100 when new, and FIG. 9d illustrates the same cross-section after tooling system 100 has been operated in angled press 1 (shown in FIG. 1). Tapered portion 202, having step 207, mates with tapered receiver 310, having step 307, when tapered knockout 200 is fully extended out of die 170. Gap 309 is created at the top of the juncture due to the fact that the length $l_2$ of tapered receiver 310 is longer than that of tapered portion 202 ($l_1$). The surface areas of knockout shaft 204 and shaft receiver 320 in contact in FIGS. 9a–9d tend to be located on one side when tooling system 100 is operated in angled press 1 (FIG. 1).

Figure 10A:
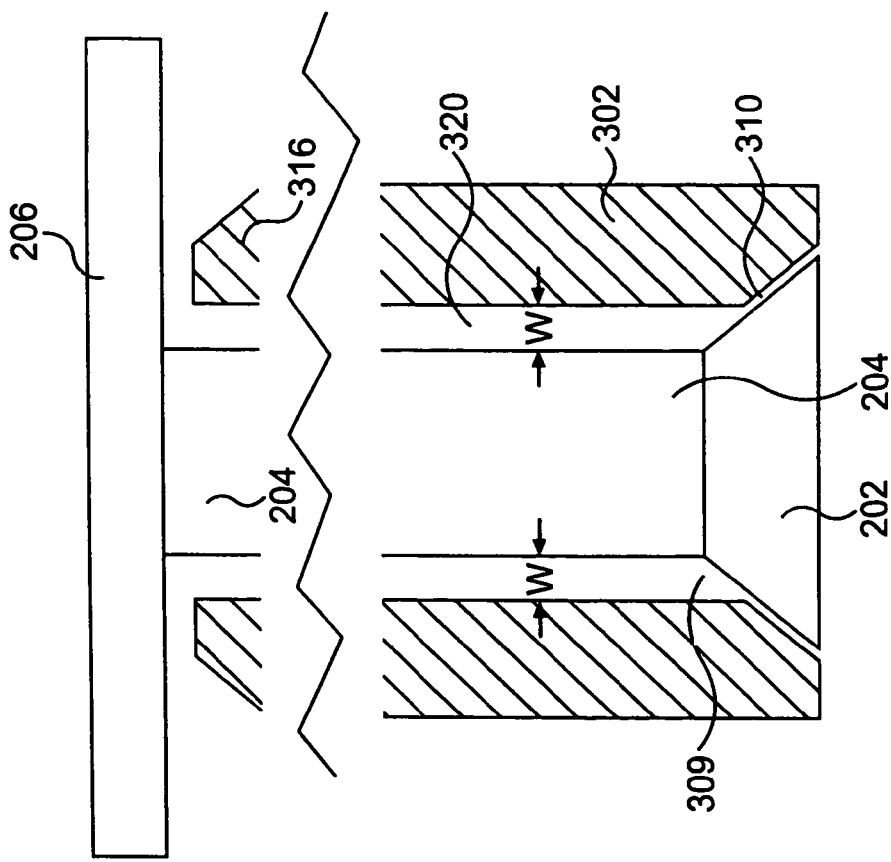
FIGS. 10a and 10b illustrate cross-sectional portions of an exemplary tooling system consistent with the present invention.
Figure 10B:
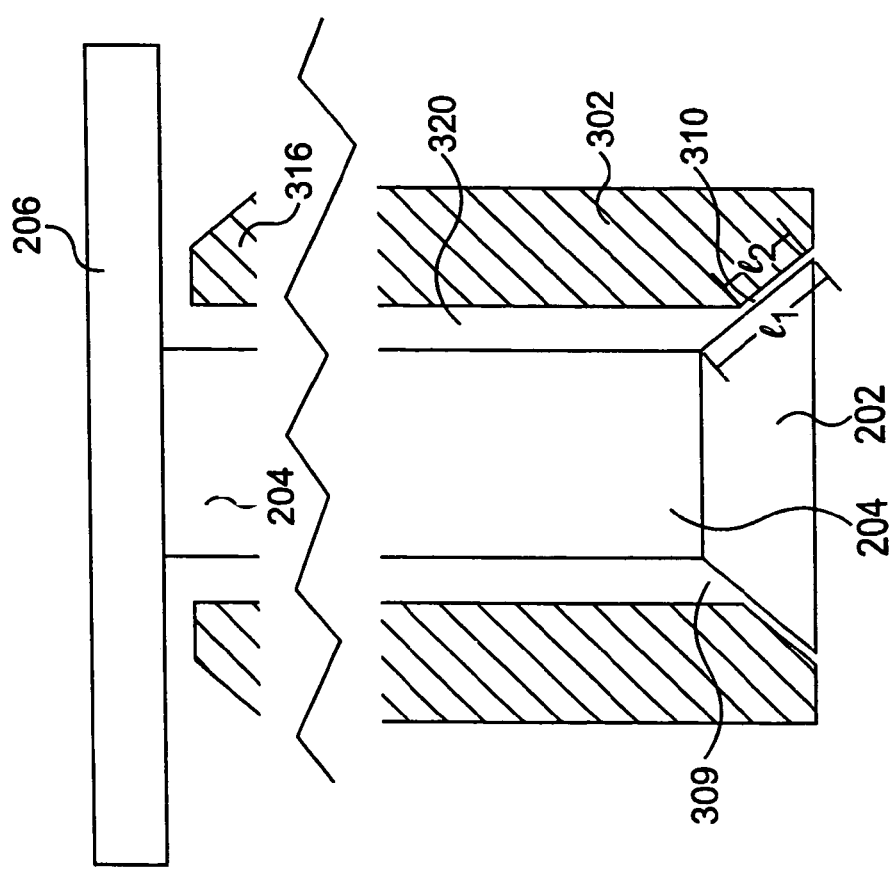

FIGS. 10a and 10b illustrate wear ("w") that occurs from operation in a press in which tooling system 100 is positioned vertically. FIG. 10a illustrates a partial cross-section of tooling system 100 when new, and FIG. 10b illustrates the same cross-section of tooling system 100 after being operated vertically in a horizontal press (instead of at an angle, as shown in FIGS. 9b and 9d). Wear ("w") of knockout shaft 204 and shaft receiver 320 caused by the contact of the two surfaces as knockout 200 is extended and retracted vertically in bushing 300 occurs around the entire surface of knockout shaft 204 and shaft receiver 320, and is not limited to one linear portion or one side.

Despite the wear ("w") shown in FIGS. 9b, 9d, and 10b, tooling system 100 maintains knockout plate 206 in a centered and level position when extended. Because of the mated, tapered structure of tooling system 100, when knockout 200 is fully extended, tapered receiver 310 mates with tapered portion 202 and maintains knockout plate 206 level and centered even if shaft 204 and shaft receiver 320 are worn. Similarly, when knockout 200 is fully retracted so that shaft 204 retracts into shaft receiver 320 and knockout plate 206 rests in die 170 (FIG. 3c), knockout 200 again is centered. Therefore, during blank insertion (knockout fully extended), product formation (knockout fully retracted), and product knockout (knockout fully extended), knockout plate 206 is centered and level despite wear on the shaft 204 and shaft receiver 320 components of knockout 200 and bushing 300.

Additionally, a cushion of air is trapped between the surface of tapered portion 202 and the surface of tapered receiver 310 in gap 309, which reduces the wear on the components. In traditional tooling systems with split collars, the surface area between the rim of the split collar and the back side of the bushing is small, thus little air is trapped and the components tend to make a loud sound as they come together when the knockout fully extends. In contrast, tapered knockout 200 makes less noise when tapered portion 202 mates with tapered receiver 310 due to gap 309 and the increased surface area between the two components, resulting in an increase in the air that is trapped and the cushion that is created.

Although tooling system 100 of the present invention is primarily shown and described herein with respect to a die assembly on the bottom of a die set comprising die (bottom) and punch (top) assemblies, as illustrated in FIG. 1, tooling system 100 may comprise die and/or punch assemblies wherein the punch assembly is on the bottom and the die assembly is on the top (not shown). It will be obvious to one skilled in the field that tooling system 100 may be configured in either the die assembly or the punch assembly, each of which may be located in either the bottom or the top of the host press. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A bushing for a die press having a base supporting a die and a knockout, the knockout being axially moveable between retracted and extended positions on a knockout shaft having a tapered end opposite the knockout, the bushing comprising:

a tubular segment defining an axial bore for slidably receiving the knockout shaft, the axial bore having a flared end for matingly receiving the tapered end of the knockout shaft when the knockout is in the extended position; and an integral flange radially extending from the tubular segment and having spaced bores for removably fixing the bushing to the base.

2. The bushing of claim 1, wherein an axial length of the flared end is longer than an axial length of the tapered end of the knockout shaft.

3. The bushing of claim 1, wherein an interface between the axial bore and the flared end is defined by an annular step perpendicular to the longitudinal axis.

4. The bushing of claim 1, wherein the flared end has the shape of a truncated cone.

5. The bushing of claim 1, wherein the flared end has the shape of a truncated right triangular pyramid.

6. The bushing of claim 1, wherein the flared end has the shape of a truncated right rectangular pyramid.

* * * * *